Aug. 18, 1959    J. T. WEIR    2,899,747
METHOD OF MEASURING THE BEARING LENGTH OF DRAWING DIES
Filed June 27, 1955
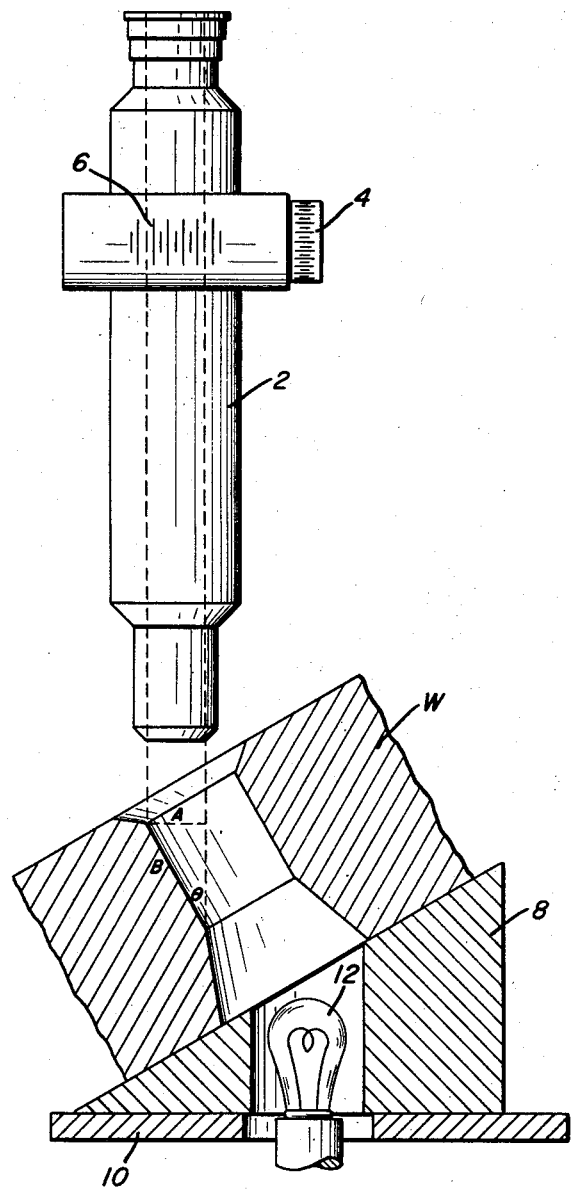
INVENTOR:
JOSEPH T. WEIR,
BY: Donald G. Dalton
his Attorney.

United States Patent Office 2,899,747
Patented Aug. 18, 1959

2,899,747

METHOD OF MEASURING THE BEARING LENGTH OF DRAWING DIES

Joseph T. Weir, Parma, Ohio, assignor to United States Steel Corporation, a corporation of New Jersey Application June 27, 1955, Serial No. 518,110

1 Claim. (Cl. 33—1)

The present invention relates to wire drawing dies and more particularly to a method for measuring the bearing length of such a die.

Prior to my invention, the determination of the length of the bearing section in a finished wire drawing die was usually done by estimation based on visual inspection. Such visual estimation was not conducive to obtaining uniform accurate measurements, particularly in the fine size ranges, since estimates made by different individuals varied. This was true even among skilled die men and, therefore, this method of measurement has never proven very reliable.

While some mechanical devices and optical apparatuses have been developed for measuring the entrance angles and the back relief angles of various sizes of wire drawing dies, to my knowledge, no device or apparatus has been developed, up to the time of my invention, that could be used to accurately measure the length of a bearing surface of a wire drawing die.

Ordinarily, the measurements of the physical characteristics, other than the bearing surface, of wire drawing dies lay in a relatively flat, easily accessible horizontal plane and are simple to handle. However, the measurement of bearing surface lengths of wire drawing dies presents a unique problem in that the dimension to be measured would necessarily be parallel with the axis of the optical of mechanical measuring instrument. This problem is made all the more vexing by the fact that in the type of wire drawing die wherein the length of the bearing surface is of greatest concern this dimension is quite small being a matter of ten thousandths of an inch in many instances.

It is, accordingly, a primary object of my invention to provide a method whereby the bearing surface length of a wire drawing die may be quickly and accurately determined with a conventional optical measuring instrument.

This and other objects will become more apparent after referring to the following specification and attached drawing in which the single figure illustrates diagrammatically a means for carrying out my new method.

Referring more particularly to the drawing, the conventional apparatus used to carry out my method consists of a monocular microscope 2 equipped with a screw micrometer attachment 4 on the eyepiece which moves a cross-hair over a small calibrated scale 6. A wire drawing die W to be measured is mounted on a small stand or holder 8 which in turn is attached to the micrometer microscope stage 10. A suitable light source 12 is disposed below the die W to illuminate its bearing surface.

The method of the invention is as follows. The die W is positioned on the holder 8 with its axis inclined at an acute angle to the axis of the microscope. The angle selected must be one that allows the entire length of the bearing section to be viewed through the microscope. I have found that a thirty degree angle will permit measurements of the finest sizes from zero up to approximately forty thousandths of an inch in bearing diameter. The micrometer scale 6 is preferably calibrated directly in hundredths of an inch and the micrometer screw arranged to permit readings in thousandths and ten-thousandths of an inch.

After the die W has been positioned on the stage, the microscope is adjusted to obtain a total magnification of approximately thirty diameters. I have found that at this magnification it is possible to view the complete bearing section without distortion. At high magnifications it is necessary to readjust the setting of the microscope to measure the complete length of the bearing surface and error would be introduced.

The die may be inclined at other angles than thirty degrees if desired and the magnification varied from thirty diameters as preferred, however, it is essential in whatever arrangement is used that both ends of the bearing surface must be in focus and visible in one setting for best results.

After the die has been properly positioned and the magnification of the microscope suitably adjusted, a reading is taken through the microscope to determine the length of the base A of the right triangle the hypotenuse of which is formed by the bearing surface B. As the length of line A is a distance along a flat plane, the reading obtained is not the true bearing surface length. The sine formula, $$\text{Sine } \theta = \frac{A}{B}$$

is applied to obtain the true bearing length. A is the distance, normal to the axis of the microscope, extending from one end of the bearing surface to the other viewed through the microscope; the angle designated $\theta$ is identical with the known angle of inclination of the die W; and the bearing surface length is designated by line B. By supplying the known and measured values in the formula, the value of B, or true bearing surface length, can be easily calculated.

While one embodiment of my invention has been shown and described, it will be apparent that other adaptations and modifications may be made without departing from the scope of the following claim.

I claim:

The method for determining the length of the bearing surface of a wire drawing die which comprises arranging the die with its axis inclined at a predetermined acute angle to the axis of a micrometer microscope, illuminating the bearing surface of the die, locating the image of the bearing surface on the scale of said micrometer microscope, the line representing the distance normal to the axis of the microscope, extending from one end of the bearing surface to the other as viewed through the microscope, constituting the base of a right triangle the hypotenuse of which is the true length of the bearing surface of said die, and said acute angle being the angle of said right triangle opposite said base.

References Cited in the file of this patent

UNITED STATES PATENTS

| 1,875,134 | Pfund | Aug. 30, 1932 |
| 1,959,537 | Kuhne | May 22, 1934 |
| 2,491,667 | Kent | Dec. 20, 1949 |
| 2,794,362 | Yale | June 4, 1957 |

OTHER REFERENCES

An article entitled "A New Method of Measuring Wear of Machinery Surfaces," by F. G. Brickenedde, on pages 620 to 622 of "Instruments," July 1947.